3,600,451
POLYMER ALKYLATION OF AROMATICS
Richard Duwayne Rowe, Dickinson, Tex., assignor to Cosden Oil & Chemical Company, Big Spring, Tex.
No Drawing. Continuation-in-part of application Ser. No. 440,281, Mar. 16, 1965. This application Sept. 5, 1969, Ser. No. 855,774
Int. Cl. C07c *15/04, 3/56*
U.S. Cl. 260—668                                    5 Claims

ABSTRACT OF THE DISCLOSURE

A polybutene polymer of high molecular weight is alkylated upon a benzene ring compound to produce heat stable higher isoalkyl compounds having at least one and usually more benzene ring positions isoalkylated to higher molecular weight higher isoalkyl benzene compounds highly heat stable and useful as lubricant, hydraulic oil, or heat transfer fluid.

---

This invention is a continuation-in-part of my copending application, Ser. No. 440,281, filed Mar. 16, 1965, and now abandoned, and relates to monocarboxylic aromatics by Friedel-Crafts alkylation of a benzene and its lower alkyl homologs with a liquid polyisobutene polymer as alkylating agent, the polyisobutene polymer having a molecular weight in the range of about 250 to 2500. The isoalkyl benzene product hereof is a mixture of higher monoisoalkyl benzenes with higher diisoalkyl benzenes.

Particularly, according to the present invention, it is found that the higher isoalkyl benzenes in which the alkyl is a polymeric butene including polyisobutylene is normally liquid, varying in viscosity from light to substantially heavy viscous liquid, according to the examples, having a molecular weight ranging from about 300 to 1500. The liquid is highly resistant to high temperature decomposition and destruction by corrosive chemicals. It does not substantially discolor when stored at temperatures as high as 400° F. for as much as thirty days and remains relatively stable liquid for sixty days under said conditions, in contrast to ordinary lubricants stored under the same conditions which would be blackened in five days and completely destroyed in fifteen days. Moreover, the liquid hereof is stable in the presence of corrosive chemicals such as halogen-containing refrigerant gases such as Freon, whereby the lubricant hereof is outstanding for both low and high temperature uses including lubrication of refrigerant compressors and the like.

Moreover, the present alkylate can be further sulfonated to produce highly stable sodium sulfonate compounds useful as a stable detergent as a plasticizer for plastics and other alkyl aromatic sulfonate uses. The ultimate reaction product may include fragments and reformation products resulting from splitting and reforming contact of the benzene alkylation product as well as the polybutene alkylating agent with the catalyst as the alkylation proceeds.

The product formed is a mixture of higher iso-alkyl specifically polybutene benzenes and lower alkyl benzenes comprising from about 30 to 80%, more usually about 65 to 78%, higher monoisoalkyl benzenes, about 5 to 65%, more usually from 22 to 35%, consisting substantially of higher dialkylated benzenes and the remainder, a minor quantity of higher iso-alkylation products such as tri-higher isoalkylated benzenes. The higher diisoalkyl benzenes usually predominate in the meta higher isomer, with a lesser quantity of para, usually no higher than diisoalkyl substitution in the ortho position being present.

In carrying out the reaction to produce substantially predominantly higher branched chain monopolybutene benzene compounds, a substantially large excess of benzene or lower alkyl benzene hydrocarbon, such as a molar ratio of from two to twenty times, is used with respect to the olefine polymer. That tendency to mono alkylation also results when using the lower temperature ranges, as will appear. However, some splitting, reformation and dialkylation will occur in any case, but the effect under lower temperatures and large aromatic excess is minimal. A higher degree of alkylation to form di, tri or tetraisoalkyls upon the aromatic nucleus, variable with the number of open and available ring positions, results from use of lower ratios of aromatic to olefinic polymer such as from .2 to 2 mol of aromatic hydrocarbon per mol of polybutene polymer reacted under higher temperatures and longer reaction times. Reaction under these conditions also has a tendency to more polymer splitting and reformation as well as multiple alkylation in more than one ring position. From these principles the character of the alkyl aromatic is subject to substantial control, but in any case the product is a mixture of alkyl aromatics in a relatively wide range of molecular weights. Narrower range products, however, are available by fractional distillation of the alkylated aromatic into narrow boiling point range fractions, usually at reduced pressures to avoid decomposition.

As aromatic hydrocarbon to be alkylated, various aromatics can be used, such as benzene, biphenyl, diphenyl methane, indene, and the like. These may be alkylated directly with the polybutene, preferably polyisobutylene, using the common Friedel-Crafts catalysts such as anhydrous aluminum chloride. The alkyl does not usually attach to the ortho position, such position being left open and available for further reaction such as sulfonation, nitration and the like to introduce such other polar radicals into the ring. However, for purposes of having para positions occupied by alkylation with polymer alkyl, the starting material itself may initially contain a lower alkyl, and such starting materials as toluene, xylene, ethylbenzene, diethylbenzene, cumene, alpha and beta methyl naphthalenes, dimethyl naphthalenes and the like are preferred starting materials for further aromatic alkylation with olefine polymer.

The alkylation is effected at temperatures above the melting point of the aromatic hydrocarbon, such as from about 0° F. up to about 250° F.

The reaction is usually carried out with an excess of the aromatic compound to be alkylated and at a temperature not lower than its melting point in the solution. For benzene the temperature would usually exceed about 40° F., and for toluene, xylene or ethylbenzene the lower limit such as −65° F. could be used. It is sometimes advantageous to use a mixture of aromatics such as benzene and toluene, or toluene, xylene and ethylbenzene, or even a wider range of mixed aromatic hydrocarbons including polycyclics. Alternatively, a solution of the aromatic in a volatile solvent such as hexane through decane, the paraffinic solvent being inert to the alkylation, can be used. Nevertheless, while temperature is controlled with the effect stated, closest molecular weight control is obtained by judicious selection initially of the olefine polymer starting material, of low, medium or high molecular weight, since, as pointed out above, a large portion of the aromatic alkylation product is a monoalkyl, variable roughly in molecular weight with the variation in molecular weight of the initial polybutene polymer.

The reaction is exothermic and the temperatures can be allowed to rise correspondingly as heat is released whereby the reaction temperature, starting low, such as around 0° F. to about +20° F. may be allowed to rise unchecked, reaching a temperature of +80 to 125° F.

Substantial alkylation is effected in a few minutes of reaction. However, to form the high alkylation products of multiple alkyls, longer periods up to about one and one-half hour may be used to effect more extreme alkylation. It is usually preferred to effect the reaction between about fifteen minutes and one hour to avoid excessive multiple alkylation.

As indicated, a further control upon the degree of alkylation is in the quantity of aromatic hydrocarbon used in the reaction mixture. Thus the quantity of aromatic hydrocarbon used will range from about 2 to 10 mols of aromatic per mol of polybutene, where the mixed alkylated aromatic product is predominantly monoalkyl containing up to about 40% dialkyl aromatics. The molar quantity of aromatics, however, may be substantially less, and a ratio of 0.2 to 2 mols of aromatic per mol of polymer may be used, in which case the average alkylation product is predominantly dialkyl at least 40% and higher. Thus, although the higher alkylation product will contain some monoalkyl, most of it is dialkyl with substantial quantities of higher alkyls in such higher alkylation mixture.

As stated, preferred Friedel-Crafts reagents such as aluminum chloride, can be used. The catalyst further contains smaller quantities of promoter substances such as hydrogen chloride. Surprisingly, the same Friedel-Crafts catalyst by which the polybutene polymer may have initially been formed, is useful and usually preferred for this alkylation, including the depolymerization which is also present.

As alkylating agents, it is preferred to use olefine polymers having an average molecular weight ranging from about 250 up to about 2500, a range available in such liquid polymers as polyisobutylene as described, for instance, in a United States patent to Jackson, 2,957,930; or a polymer produced by polymerizing a $C_4$ olefine gas mixture comprising predominantly poly-n-butenes, such as polybutene-1, poly cis- and trans-butene-2. Such polymers range from light oils through fairly viscous liquid polymers and, as such, may be selected as liquid polymer fractions sometimes of narrow average molecular weight, range, for instance, 250 to 400, or 400 to 600, or 600 to 1000, or 1000 to 1500 molecular weight and higher. While such molecular weights are stated as an average, individual components in the wide ranging mixture may be higher and lower than the ranges given.

Since the aromatic alkylation products hereof have a wide range of molecular weights, in addition to removal of the unreacted components, alkylated products can be separated by fractional distillation, usually at reduced pressure, into fractions of desired molecular weight as well as boiling point and viscosity characteristics.

In carrying out the reaction, the polyolefine is added to a selected quantity of the aromatic hydrocarbon, and usually about 1 to 5% by weight of Friedel-Crafts catalyst based on the alkylatable aromatic olefine and polymer components is also added, usually with agitation, holding the temperature in the range stated. The upper limit of catalyst is based largely upon aspects of economy rather than as a critical reaction limit; large quantities would operate as well. The reaction is continued for the selected period of time, some one-quarter to one hour, depending upon the degree of alkylation desired, as explained. The reaction may be carried out in a pressure vessel and with the temperature controlled as stated.

After reaction the product may be washed free of catalyst, sometimes with filtration and/or clay treatment, and then may be separated into select liquid fractions as desired.

The alkylated aromatic products are heavy oily liquids variable in molecular weight, boiling point and viscosity according to fractions selected. In general they may be identified as composed initially as formed of from about 30 to 80% mono higher isoalkyl benzene, from about 5 to 65% dihigher isoalkyl benzene, and the remainder higher alkyl such as tri-isoalkyl benzene. The reference to mono-isoalkyl or di-isoalkyl benzenes refers to the added alkyls by the alkylation reaction independent of some alkyls that may have been initially present in the benzene starting material.

The products herein formed can be separated into select fractions or used as such as lubricants per se, or as lube oil additives, hydraulic, heat transfer and transmission fluids. These products can be sulfonated, nitrated or halogenated in any unsubstituted positions remaining in the aromatic ring nucleus.

The alkyl benzenes hereof are extremely stable at high temperatures and, consequently, are outstandingly useful as lubricants per se since they do not decompose with heat over long periods of time. That same property dictates the outstanding properties for the uses listed; for instance, as heat-transfer fluids. The alkyl benzenes, moreover, are quite compatible with liquid polybutenes per se and, hence, blends thereof in typical proportions of 10:90 and through 90:10 volumes of poly-higher isoalkyl benzenes to isobutylene liquids are useful formulations. Moreover, as lubricants the higher polyisobutyl benzenes, in contrast to ordinary mineral lubricating oils, have low pour points which are compatible with refrigerent gases such as the Freons, and will not dissolve nor substantially plate copper, all highly desirable properties in lubricants for refrigerant compressors.

For these reasons, and as illustrated in the example below, the polyisobutyl benzene compounds hereof are outstanding lubricants. While they can be blended for some purposes with ordinary mineral oils and the typical lubricant additives, they can also be used in such blends as stated, or without blending with other lubricant liquids.

It is generally preferred, in order to impart a detergent effect, to sulfonate with 80 to 100% sulfuric acid, $SO_3$, or a mixture of sulfuric acid and $SO_3$, in which the 2 or 4 ring positions, whichever is available, is sulfonated. After reaction the acid product is neutralized with either alkali metal hydroxides or ammonia to form readily or difficultly water-soluble soaps depending on the molecular weight; or with other insoluble soap forming metal salts or oxides thereof as known in the detergent art, such as barium, calcium, magnesium, strontium, lead, zinc, aluminum, manganese salts or the like to form soaps useful either as detergents or as oil additives. The alkyl aromatic products have a low pour point and good heat stability, which makes them outstanding for lubricant, heat transfer and low temperature exposure purposes. The products can be further halogenated to impart extreme pressure lubricant properties.

The alkyl aromatics product after forming with or without sulfonation is a light amber colored oily liquid. It can be converted to products of water-white, odorless, and of highly stable character by slight hydrogenation under conditions to remove traces of unsaturation in the side chain as described in the Dyer Patent, 3,100,808, or the oil can be more drastically hydrogenated to saturate the ring whereby the alkylated ring compound has a high calorific value per unit of volume. The hydrogenation produces products which are very inert, colorless, water-white and odorless oils, having good stability at both low and high temperatures.

The following examples illustrate production of the higher isoalkyl polybutene benzenes.

EXAMPLE I 14 pounds of toluene, 14 pounds of polyisobutylene having an average molecular weight of 767, and 0.35 pound of powdered aluminum chloride were slowly added to a jacketed reactor with stirring, 1 gram portions of HCl gas being added intially and at five minute intervals. The reactor was cooled by circulating brine at 30° F. The temperature of the reaction mixture rose to a maximum of 96° F. The reaction was terminated in 34 minutes, the product being washed with water and filtered through attapulgus clay, and then the unreacted toluene was stripped. 15 pounds of stripped toluene alkylation were recovered as stripper bottoms.

A first batch of 644.5 grams of said toluene alkylate was charged to a still operated under vacuum of 6 mm. Hg, the overhead being cut at a temperature at standard conditions of 555° F. 304.3 grams of alkylate were recovered as bottoms, having an average molecular weight of 464, 280.3 grams being recovered as overhead, and 59.9 grams being lost as vapors. Infra-red analysis of the bottoms product indicated that it was predominantly isoalkyl-substituted aromatics consisting of large quantities of both mono- and diisoalkyl benzenes, the diisoalkyl benzenes being substantially meta oriented.

A portion of said toluene alkylate amounting to 11.25 pounds was separately distilled under vacuum and cut at a temperature equivalent to 670° F. at standard conditions. 4.15 pounds of bottoms were obtained, 7.00 pounds being condensed as overhead and 0.10 pound being lost as non-condensible volatiles during the distillation. The bottoms product as found to have a molecular weight of 748, consisting substantially of monoisoalkylated toluene having a wide molecular weight range.

EXAMPLE II 314 grams of $C_4$ liquefied refinery gases, exhausted by preliminary polymerization first to form a polyisobutylene, the liquefied spent gases having a composition as follows:

| Component: | Mol percent |
| --- | --- |
| $C_2$ | 0.1 |
| $C_3$ | 0.4 |
| $IC_4$ | 33.8 |
| $NC_4$ | 17.4 |
| Butene-1 | 15.9 |
| Isobutylene | 4.3 |
| Trans-butene-2 | 18.0 |
| Cis-butene-2 | 10.1 | were placed in a Parr bomb with 20 grams of powdered aluminum chloride and 1 gram HCl gas and cooled in a Dry Ice-acetone bath. The reaction mixture was allowed to warm to −8° C. to initiate reaction and held at that temperature for fifty minutes until the reaction was completed. The product was a copolymer of poly-n-butene-1, poly-n-butene-2, both cis and trans, the cis predominating, and isobutylene. It was a pale amber liquid which on distillation to a bottoms temperature of 420° F. gave a bottoms n-olefine polymer product having a viscosity of 251.6 SSU at 210° F., a bromine number of 23.6, and an average molecular weight of 719. The product was used as an alkylation material for benzene. It was charged to a reactor in quantity of 133.4 grams of polymer, 69.4 grams of benzene, 2 grams of powdered aluminum chloride, and 1 gram of HCl gas. The initial temperature of the mixture was 3.4° C. and, after sixteen minutes of reaction time, reached a maximum temperature maintained by cooling in an ice bath of 24° C. The product was washed with water and filtered and distilled to an overhead temperature of 176° C. at 6 mm. of mercury which was equivalent to 630° F. at standard conditions. The product bottoms, a mixture in wide range, had an average molecular weight of 622 and was substantially mixed alkyl-substituted benzene compounds of both mono- and dialkyl benzene types.

EXAMPLE III 2030 grams of polyisobutylene was charged in approximate 4:1 molar ratio with benzene to a four liter flask reactor with 45 grams of powdered aluminum chloride and 1 gram HCl gas and cooled in an ice bath. The initial temperature of the reaction mixture as 32° F., the maximum temperature of 50° F. being maintained by adding the aluminum chloride in small increments over a period of 1½ hours. At the end of this time the volatiles were removed by stripping, 1671 grams of alkylated benzene being recovered. The initial polyisobutylene had an average molecular weight of 299, a bromine number of 55, a viscosity of 148 SSU at 100° F., and a specific gravity 60°/60° of .839. The stripped reaction product was freshly distilled into three fractions:

(1) FBP—170° C. OH—198° F. Btms at 4.9 mm. Hg
(2) FBP—215° C. OH—500° F. Btms at 5.4 mm. Hg
(3) FBP—300° C. OH—590° F. Btms at 6.0 mm. Hg The fraction (2) had an average molecular weight of 343 and the fraction (3) an average molecular weight of 448. Each fraction was identified as substantially wide molecular weight range mixture of alkyl benzenes including mono, di- and trialkyl types in which the mono-alkyl predominated.

EXAMPLE IV

Polyisobutylene having an average molecular weight of 700, a viscosity of 16,646 SSU at 100° F. and a specific gravity of .870 in quantity of 5817 grams together with 7520 grams of benzene, a mol ratio of 12:1 benzene to polybutene, were charged to a reactor. The mixture was cooled with cold brine to a temperature of 32° F. 188 grams of aluminum chloride and 5 grams of HCl gas were added to initiate the reaction. The reaction was allowed to continue over a period of 11 minutes, reaching a maximum temperature of 82° F. with a total contact time of twenty minutes. The yield was 76.8% of alkylate, the product being filtered through clay. 5927 grams were charged to a still, the overhead temperature at 3.6 mm. Hg being 151° C., which is equivalent to 595° F. at standard conditions. The theoretical alkylate recovery was 48.3 weight percent. The bottoms recovery was 40.8 weight percent which was 84.5% of theory. The average molecular weight of the bottoms was 400. The product was analyzed to be a mixture predominantly of monoalkyl, and most of the di-alkyls present were substituted meta.

EXAMPLE V 239 grams of polyisobutylene as identified in Example III having an average molecular weight of 377 and a bromine number of 48.5, together with 312 grams of benzene, a mol ratio of 5.5 to 1, were placed in a glass reaction vessel after first cooling to 32° F. in an ice bath. 148 grams of aluminum chloride and 2 grams of HCl gas were added to initiate reaction, the total contact time being sixteen minutes, the reaction being terminated after seven minutes, reaching a miximum temperature of 90° F. The product was filtered through clay. After stripping unreacted benzene, the alkylate product in quantity of 124.75 grams was distilled under 10 mm. Hg, equivalent to an overhead temperature of 500° F. at standard conditions. The bottoms temperature was 345° F. Theoretical alkylate formation was 53.69%, actual recovery being 40.5 weight percent, a 75.5% of theory yield being obtained. The average molecular weight of the bottoms was 427. Infrared analysis indicated that the product was largely monoisoalkyl benzene and meta-diisoalkyl benzene, very little para-diisoalkyl benzene being present.

EXAMPLE VI 100 grams of polyisobutylene having an average molecular weight of 669 and a bromine number of 24, 1000 grams of benzene, 47 grams of aluminum chloride and 3 grams of HCl gas were cooled on an ice bath and then reacted for a period of ten minutes, a maximum temperature of 65° F. being reached. The benzene was stripped and the alkylate stripper bottoms product had a bromine number of 0.9. The product was washed and filtered and distilled at a pressure of 3.7 mm. Hg at a top overhead temperature equivalent to 560° F. at standard conditions. The bottoms temperature was 360° F. A theoretical alkylate yield was 51.55%, the bottoms recovery being 41.3 weight percent of theory. The bottoms product had an average molecular weight of 502, and a specific gravity 60/60 of .898. Infra-red analysis indicated high monoisoalkyl and meta-diisoalkyl substitution in a wide range of molecular weights.

EXAMPLE VII

A heavy polyisobutylene having an average molecular weight of 1258, a viscosity of 962 SSU at 210° C. and a bromine number of 9.0 in quantity of 233 grams was reacted with 231 grams of benzene in a glass reactor, the mol ratio of benzene to the polyisobutylene being about 16:1. The mixed reactants were further mixed with 5.3 grams of aluminum chloride and 3 grams of HCl gas and allowed to react for two minutes in a total contact time of twelve minutes. The temperature initially at 50° F. rose to 108° F. The alkylate produced had a bromine number of 0.45. It was filtered with clay. 136.5 grams of alkylate was obtained after stripping the unreacted benzene and was distilled at 132° C. at 2.8 mm. Hg, the temperature being the equivalent of 560° F. at standard conditions. Theoretical alkylate produced was 53.3 weight percent, a bottoms product of 38.3 weight percent or 71.8 percent of theory being obtained. The average molecular weight of the bottoms was 519, and infra-red analysis indicated the product to be largely mono- and meta-dialkyl benzene.

EXAMPLE VIII 360 grams of polyisobutylene as identified in Example III having an average molecular weight of 299 and a bromine number of 55 were reacted with 320 grams of benzene. The reaction mixture was precooled in an ice bath, 10 grams of powdered aluminum chloride being added, and 1 gram of HCl gas was bubbled into initiate the reaction. The reaction was run over a period of 25 minutes, a maximum temperature of 115° F. being reached. The product was clay filtered. After distilling off excess benzene, 122 grams of reaction product were distilled under 2.4 mm. Hg pressure at an overhead temperature ranging from 550 to 572° F. at standard conditions. The product obtained had an average molecular weight of 370 and a viscosity at 210° F. of 45.72 SSU, and at 100° F. of 270.4 SSU. The product was analyzed to contain 73% monoisoalkyl benzene, 17% meta diisoalkyl benzene and 10% para diisoalkyl benzene and had a bromine number of 0.3.

EXAMPLE IX

Polyisobutylene having an average molecular weight of 881 and a bromine number of 14 before reaction in quantity of 371.5 grams, and benzene in quantity of 329 grams were pre-cooled in an ice bath to 32° F., mixed with 10 grams of powdered aluminum chloride and 1 gram HCl gas to initiate reaction, and reacted over a period of three minutes, with a total contact time of 10 minutes, a maximum temperature of 104° F. being reached. The product was water washed and clay filtered. After stripping of excess benzene, 132 grams of reaction product were distilled under 2.4 mm. Hg pressure at an overhead temperature corresponding to 565° F. at standard conditions. The bottoms temperature reached 330° F. at 2.4 mm. Hg. The alkylated product theoretically was 57.7 weight percent but 44.3 weight percent or 76.8 percent of theory of bottoms were recovered, having an average molecular weight of 490 and a bromine number below 0.6. The infra-red analysis indicated high mono- and meta-dialkyl substitution.

EXAMPLE X

Four lubricants prepared as in Examples I, III, IV and VIII having molecular weights respectively as stated in these examples, were each hermetically sealed with one-half volume of refrigerant Freon 12 per volume of lubricant, in pressure resistant containers. Similar charges were made of two mineral lubricants, one being a paraffin base and the other a naphthenic base mineral oil, respectively having molecular weights of 466 and 337. Both of these oils are well-known commercial lubricants which had been used for refrigeration compressor lubrication. Each of the containers had interior surfaces of poly steel and had strips of pure copper suspended therein sealed with the lubricant refrigerant mix. In five days of heating, both of the mineral oils were completely blackened and dissolved between 380 and 36,000 parts per million of copper which showed substantial copper plating upon the metal of the container. In contrast, each of the polyisobutyl benzene products were hardly discolored after five days, but did show some discoloration after sixty days, but after sixty days were very much less discolored than the equivalent discoloration of both mineral oils after five days. Moreover, the synthetic polyisobutyl benzenes hereof dissolve up to seven parts per million of copper as a maximum in sixty days and plated out a far smaller quantity of copper. Finally, with respect to lubricity and wear, it was found in testing on a 4-ball-fatigue-test (ASLE Trans. vol. 5, 1962, pp. 172–182) that the polyalkyl benzenes hereof had approximately the same high lubricity results.

Examples I through X indicate that the aromatic isoalkylation product comprises higher isoalkyls of high molecular weight, variable from that of the initial polymeric isoolefine starting material. The reaction product, even by comparision of bromine numbers, indicates that it is largely iso-alkylated aromatics. For instance, Example IX shows bromine number reduced to a mere trace in the bottoms product. That bottoms product, it will be recognized, starts with a molecular weight of 881 before alkylation and winds up with an average molecular weight of 490 in which the product was analyzed to be both mono- and meta-dialkyl benzene.

While it is clear that some of the polybutene does depolymerize into smaller chain groups and one or more chains alkylate to the benzene, nevertheless the isoalkyl remaining still has quite high molecular weight. Moreover, the mixed isoalkyls can both be high molecular weight. Despite polymerization, depolymerization and trans-alkylation resulting by the several reactions which take place in the presence of the catalyst, the ultimate reaction is alkylation, and little or none of the isoolefine remains unreacted.

Again, considering Example III, the average molecular weights of the second and third fractions are widely distinguished. Each of the isoolefins polymer starting materials, as used in the examples above, has itself been prepared by polymerization in the presence of a Friedel-Crafts catalyst and, consequently, is inert to the Friedel-Crafts catalyst until the alkylation reaction is initiated. Apparently during that reaotion the polymeric material becomes partially split as the alkylation reaction continues. The molecular weight of the alkyls in the starting polymer is quite high, usually exceeding about 250 so that despite some splitting, the alkyl benzene material will exceed about 300 in any case. Moreover, the split portions may be realkylated upon another alkyl thereby to maintain the high molecular weight character of the alkylate despite any splitting. It seems further to be evident that the alkylation reaction is preferential, since the bromine number of the polyolefinic starting product is radically reduced. The multiple alkyls appear to be introduced into the ring as meta-substituents and to a lesser degree the para position, leaving the other positions open for further substitution such as by sufonation or nitration.

A certain amount of additional control to regulate the substitution positions is available by use of a starting material such as lower alkyl benzenes which already have one or two substituents in the ring before alkylation with isoolefine polymer as described herein. For this purpose mono-, di- or tri-lower derivatives of said aromatic hydrocarbons can be used, the lower alkyl usually consisting of 1 to 4 carbon atoms.

What is claimed is:

1. Liquid mixture of high molecular weight isoalkyl aromatic hydrocarbons having an average molecular weight exceeding about 300 and consisting essentially of from 30 to 80% of monoisoalkyl aromatic hydrocarbon, 5 to 65% of diisoalkyl aromatic hydrocarbons and the remainder still higher isoalkyl aromatic hydrocarbon, said higher isoalkyl radicals of said mixture being selected from the group consisting of liquid polyisobutylene and liquid copolymer of isobutylene with n-butenes, said polymeric higher isoalkyl radicals having a molecular weight in a range of about 250 to about 2500, the aromatic radicals of said isoalkyl aromatic hydrocarbons being selected from the group consisting of benzene and lower alkyl benzenes having at least two alkylatable ring positions through which said higher isoalkyl radicals may be attached to the benzene ring, said higher isolakyl radicals being alkylated upon said aromatic radicals by Friedel-Crafts alkylation reaction at a temperature ranging from about the melting point of the aromatic hydrocarbon up to about 250° F. with a catalyst selected from the group consisting of aluminum chloride, aluminum bromide, boron fluoride said catalyst being promoted with a promoter selected from the group consisting of hydrogen fluoride, hydrogen chloride, hydrogen bromide and the alkyl chlorides, bromides and fluorides.

2. The method of forming a liquid mixture of a high molecular weight polymeric isoalkyl aromatic hydrocarbon having an average molecular weight exceeding about 300 and consisting essentially of from 30 to 80% of polymeric monoisoalkyl aromatic hydrocarbon, 5 to 65% of polymeric diisoalkyl aromatic hydrocarbons and the remainder still higher isoalkyl aromatic hydrocarbons, said polymeric higher isoalkyl radicals of said mixture being selected from the group consisting of liquid polyisobutylene and liquid copolymer of isobutylene with n-butenes, said polymeric higher isoalkyl radicals having a molecular weight in the range of about 250 to about 2500, the aromatic radicals of said isoalkyl aromatic hydrocarbon being selected from the group consisting of benzene and lower alkyl benzenes having at least two alkylatable ring positions through which said higher polymeric isoalkyl radicals may be attached to the ring, comprising reacting said aromatic ring compound with said liquid polyisobutene compound with a Friedel-Crafts catalyst selected from the group consisting of aluminum chloride, aluminum bromide, boron fluoride, said catalyst being promoted with a promoter selected from the group consisting of hydrogen chloride, hydrogen bromide, hydrogen fluoride and the alkyl chlorides, bromides and fluorides.

3. The product as defined in claim 1 wherein the mixture of higher polymeric isoalkyl-substituted aromatic hydrocarbon predominantly contains higher meta-diisoalkyl aromatic hydrocarbons.

4. The method as defined in claim 2 wherein the mixture of higher polymeric isoalkyl-substituted aromatic hydrocarbon predominantly contains higher meta-diisoalkyl aromatic hydrocarbons.

5. A lubricant comprising a higher isoalkyl benzene compound as defined in claim 1.

References Cited

UNITED STATES PATENTS

| | | |
|---|---|---|
| 2,437,356 | 3/1948 | Hill. |
| 2,810,769 | 10/1957 | Sanford et al. |
| 3,173,965 | 3/1965 | Pappas et al. _____ 260—671 |
| 3,367,865 | 2/1968 | Gudelis _____ 260—671 |
| 3,422,161 | 1/1969 | Lavigne et al. _____ 260—671 |

CURTIS R. DAVIS, Primary Examiner

U.S. Cl. X.R.

252—59; 260—671G